Aug. 15, 1950     R. C. DAVIS ET AL     2,519,233
AIRCRAFT TRAINER Filed June 30, 1944     6 Sheets-Sheet 1

INVENTORS: V. F. BOHMAN
R. C. DAVIS
C. E. GERMANTON

BY *P. C. Smith*

ATTORNEY

Aug. 15, 1950    R. C. DAVIS ET AL    2,519,233
AIRCRAFT TRAINER
Filed June 30, 1944    6 Sheets-Sheet 2

FIG. 5

INVENTORS:
V. F. BOHMAN
R. C. DAVIS
C. E. GERMANTON

BY
P. C. Smith
ATTORNEY

Aug. 15, 1950  R. C. DAVIS ET AL  2,519,233
AIRCRAFT TRAINER
Filed June 30, 1944  6 Sheets-Sheet 3

INVENTORS: V. F. BOHMAN
R. C. DAVIS
C. E. GERMANTON
BY P. C. Smith
ATTORNEY

Patented Aug. 15, 1950

2,519,233

UNITED STATES PATENT OFFICE 2,519,233

AIRCRAFT TRAINER

Richard C. Davis, Great Neck, and Vincent F. Bohman, Astoria, N. Y., and Charles E. Germanton, Summit, N. J., assignors to Bell Telephone Laboratories, Incorporated, New York, N. Y., a corporation of New York Application June 30, 1944, Serial No. 542,984

18 Claims. (Cl. 35—12)

This invention relates to aircraft trainers and more particularly to apparatus for simulating, in the operation of the controls, the reactions which the pilot would receive in the operation of an actual aircraft.

In the control of an aircraft the pilot feels resistance to the operation of the stick or yoke, of the aileron wheel if provided separate from the yoke, and of the rudder pedals which varies in accordance with the pressure of the slip stream against the control surfaces of the elevator, of the aileron and of the rudder and is a function of the air speed of the aircraft and of the attitude of the aircraft. For example, when the pilot pulls the stick back to execute a climbing maneuver or pushes it forward to execute a diving maneuver, the elevator is moved out of its normal plane and therefore becomes engaged by the slip stream to a greater or less extent dependent upon the steepness of the intended climb or dive, and the pressure of the slip stream upon the elevator surface reacts as a resistance to the movement of the elevator which is transferred to the stick as a resistance to be overcome by the pilot in moving the stick. Similarly on a correctly executed turn the movement of the rudder from its normal straight flight position subjects its surface to the pressure of the slip stream which reacts as a resistance to the movement of the rudder which is transferred to the rudder pedals as a resistance to be overcome by the pilot in their movement, and, the movement of the ailerons from their normal positions subjects their surfaces to a change in pressure from the slip stream which reacts as a resistance to their movement which is transferred to the aileron control wheel or stick as a resistance to be overcome by the pilot in the movement of the wheel or stick. Also, since some elevator control is also required on a correctly executed turn to keep the nose of the aircraft up, the pilot will encounter some resistance to the forward movement of the stick. At other times the movement of the controls does not meet as great resistance transmitted thereto by pressures applied against the control surfaces. The resistance to the movement of the control surfaces is a function of the air speed of the aircraft and, in general, increases as the air speed increases.

Due to the disposal of the live, fuel or cargo loads in an aircraft, the aircraft may not be in correct balance around its axes for straight level flight. In order that it may be possible to properly balance or trim the aircraft and thus relieve the pilot from the necessity of exercising a constant effort to maintain the aircraft in a level straight line flight, its control surfaces are provided with trimming tabs which may be adjusted by trimming wheels placed near the pilot's seat. For example, if the aircraft is either nose heavy or tail heavy and therefore has a tendency to pitch, the trimming tabs hinged to the trailing edge of the elevator may be moved by the elevator trimming wheel resulting in increasing the camber of the airfoil so that if the tab is moved down the elevator surface is caused to move up to cause the nose of the aircraft to rise, or if the tab is moved up the elevator surface is caused to move down to cause the nose of the aircraft to fall until the correct attitude for level flight has been attained. Similarly, if the aircraft has a tendency to yaw in one direction or the other the trimming tab hinged to the trailing edge of the rudder may be moved by the rudder trimming wheel resulting in increasing the camber of the airfoil so that the slip stream encountering the rudder trimming tab will move the rudder sufficiently to cause the aircraft to fly a straight course. Also, if the aircraft has a tendency to roll about its longitudinal axis, trimming tabs hinged to the trailing edges of the aileron may be moved by the aileron trimming wheel resulting in increasing the camber of the airfoils so that the slip stream encountering such tabs will move the ailerons sufficiently to cause the aircraft to assume a level position with respect to its longitudinal axis.

The pilot may also use the trimming wheels to reduce the effort required to move the controls since the setting of the trimming tabs is effective to cause the slip stream to move the large control surfaces to which the tabs are secured. If, for example, the aircraft is to be flown on a climbing flight to gain a high altitude the pilot may pull back the stick or yoke until the aircraft is climbing at a desired steady rate of climb and then the pilot may set the elevator trimming tabs so that they will hold the elevator in the required position without further effort on the part of the pilot.

It is an object of the present invention to simulate in an aircraft trainer the change in loadings or resistances to the movement of the controls of an aircraft under different flight conditions.

A further object of the invention is to simulate in an aircraft trainer the effect on the controls of an actual aircraft incident to the operation of the trimming wheels.

To attain these objects the trainer is provided with mechanisms which apply loadings to the elevator control stick or yoke, to the aileron control wheel and to the rudder control pedals and with a further tensioning mechanism which varies the loadings in accordance with the indicated air speed of the simulated flight. Each loading mechanism comprises a loading pulley which may be turned by the control member with which the loading mechanism is associated, as, for example, by the movement of the stick or yoke, which loading pulley turns in one or the other direction dependent on the direction of movement of the control member against an increasing tension exerted by a spring. The resistance offered by the spring to the rotation of the loading pulley and the movement of the control member is varied by the tensioning mechanism controlled through its associated motor circuit from the indicated air speed motor control circuit of the trainer.

Each loading mechanism has an associated motor control circuit which is controllable by a potentiometer operated by one of the trimming wheels to control a motor to change the neutral point of the loading applied through the mechanism to the control member with which it is associated. For example, the loading applied by the elevator loading mechanism to the yoke during a climbing maneuver may be neutralized without changing the position into which the yoke has been moved by the pilot by the rotation of the elevator trimming wheel in the proper direction thereby controlling the motor control circuit associated with the elevator loading mechanism to ease off the spring tension applied to the yoke and against which tension the pilot must hold the yoke.

The novel features of the invention are set forth in the appended claims and the invention as to its organization and its mode of operation will be best understood from a consideration of the following detailed description when read in connection with the accompanying drawings in which:

Figure 5:
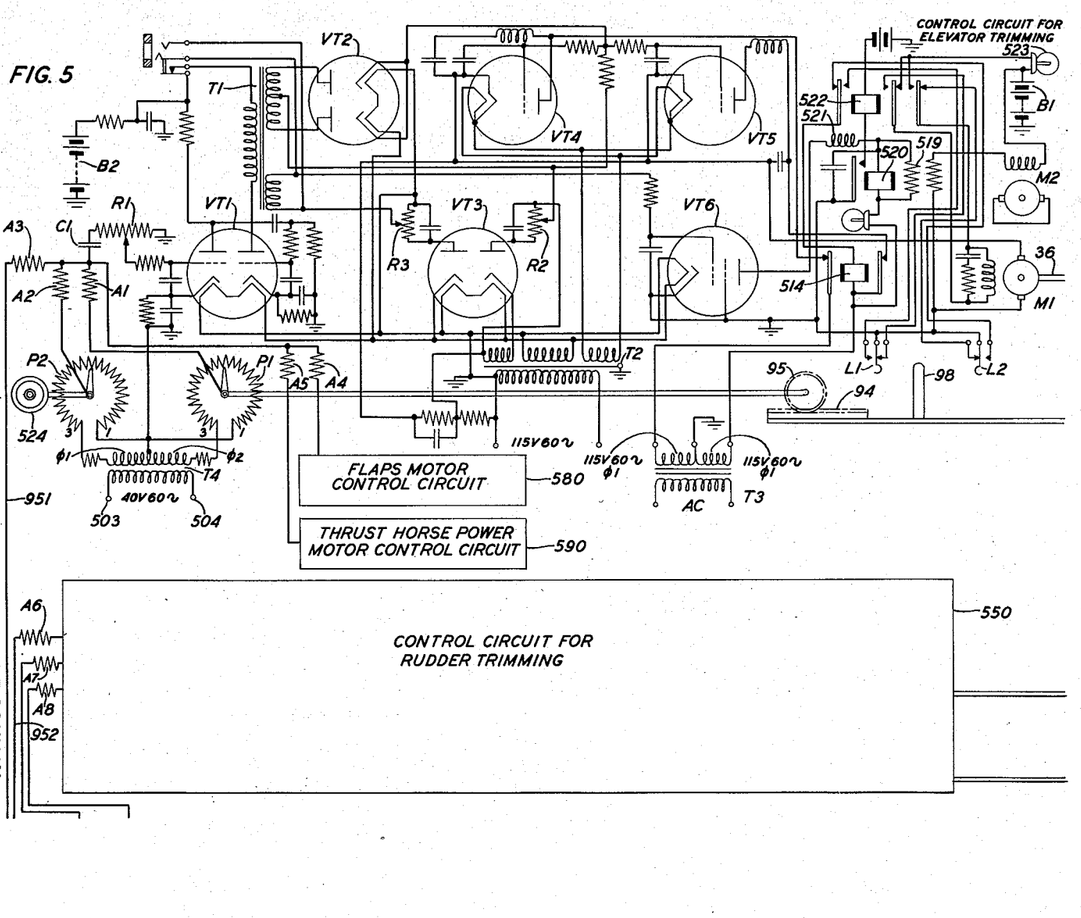
Fig. 5 shows in the upper portion thereof the motor control circuit associated with the elevator trimming or loading mechanism schematically disclosed in the upper portion of Fig. 6 and shows in the lower portion thereof a box representing a similar motor control circuit associated with the rudder trimming or loading mechanism disclosed schematically in the lower portion of Fig. 6.
Figure 6:
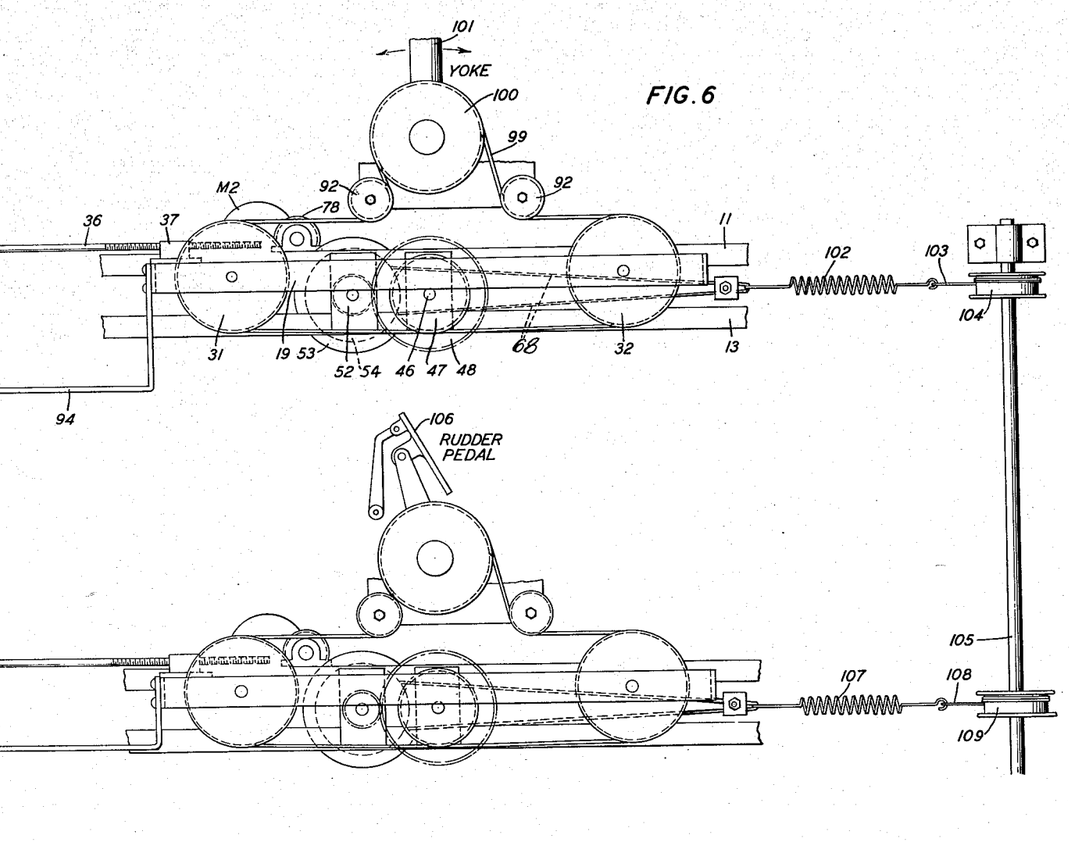
Fig. 6 shows in the upper portion thereof the loading mechanism for loading the yoke or stick of the trainer and shows in the lower portion thereof the loading mechanism for loading the rudder pedals of the trainer.
Figure 7:
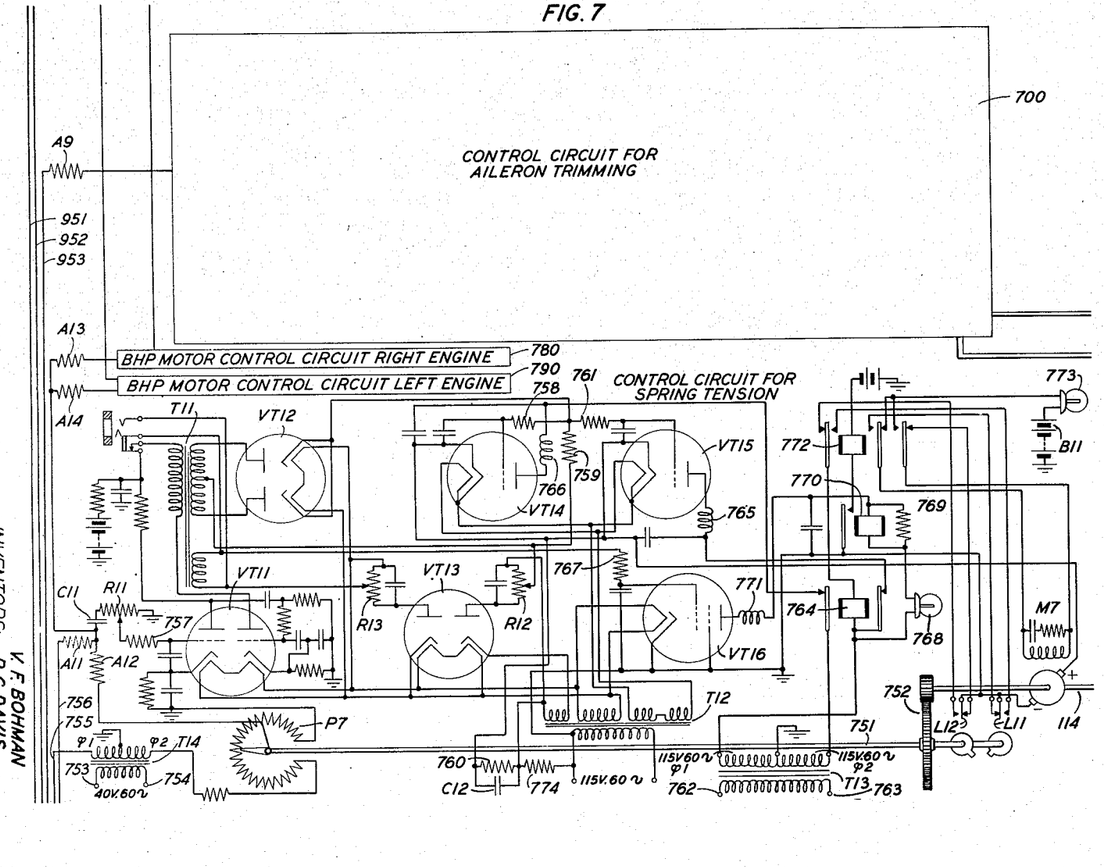
Fig. 7 shows in the upper portion thereof a box representing the motor control circuit associated with the aileron trimming or loading mechanism schematically disclosed in the upper portion of Fig. 8 and shows in the lower portion thereof the motor control circuit and motor for driving the spring tensioning drums of Figs. 6 and 8.
Figure 8:
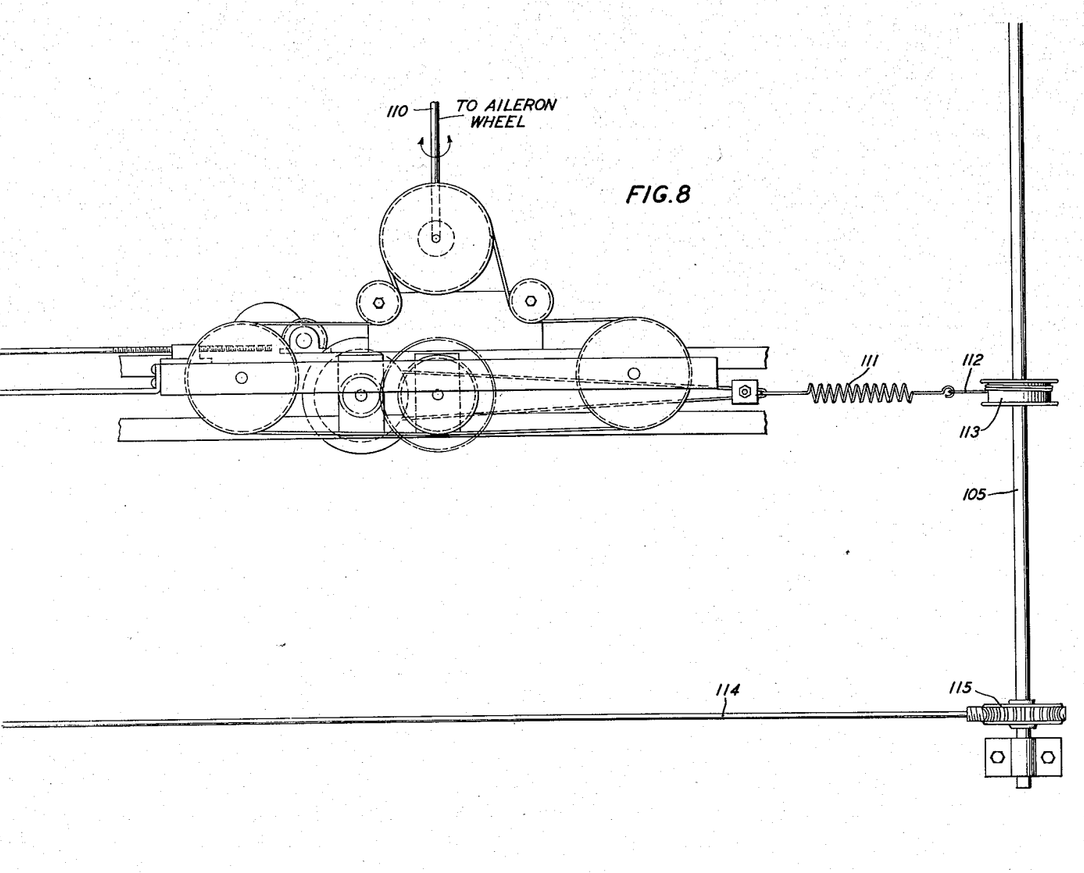
Fig. 8 shows the loading mechanism for loading the aileron control wheel.
Figure 9:
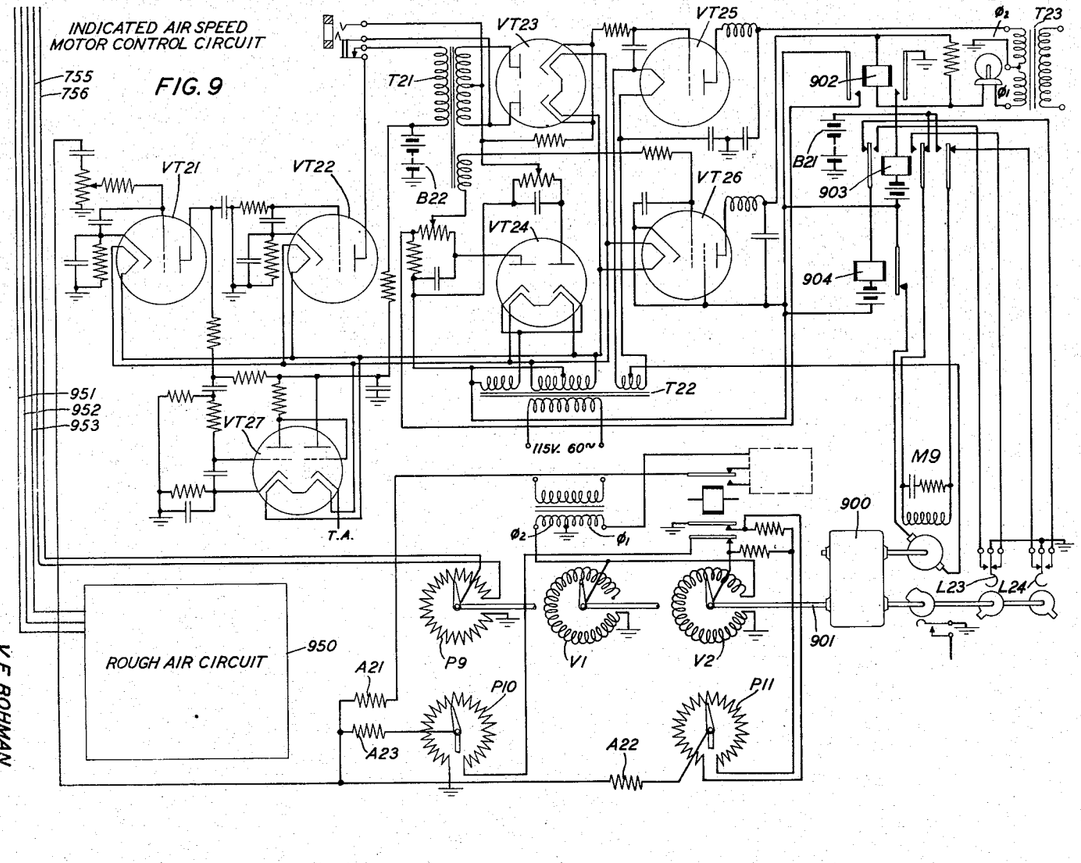
Fig. 9 shows the indicated air speed motor control circuit of the trainer from which the spring tensioning motor control circuit is controlled.

To better visualize the invention Fig. 7 should be placed beneath Fig. 5, Fig. 9 should be placed beneath Fig. 7 and Figs. 6 and 8 should be placed on the right of Figs. 5 and 7, respectively.

Referring first to Figs. 1 to 4, inclusive, which disclose one of the trimming or loading mechanisms and in particular the trimming mechanism which is provided for loading the yoke, the mechanism is supported on an angle iron frame having two end members the right one of which comprises two short vertical angle irons 1 and 2 secured as by welding to two horizontal angle irons 3 and 4. The horizontal flange of the angle iron 4 is slotted at 5 to receive bolts by which the end member of the frame may be secured to a mounting rack. The left end member is similarly constructed and comprises two vertical angle irons 6 and 7 secured to a horizontally disposed plate 8 and to an angle iron 9, the horizontal flange of the angle iron 9 being slotted as at 5 to receive bolts by which the left end member may be secured to a mounting rack. The end members are secured as by welding to the opposite ends of four longitudinally disposed angle irons 10, 11, 12 and 13.

Figure 1:
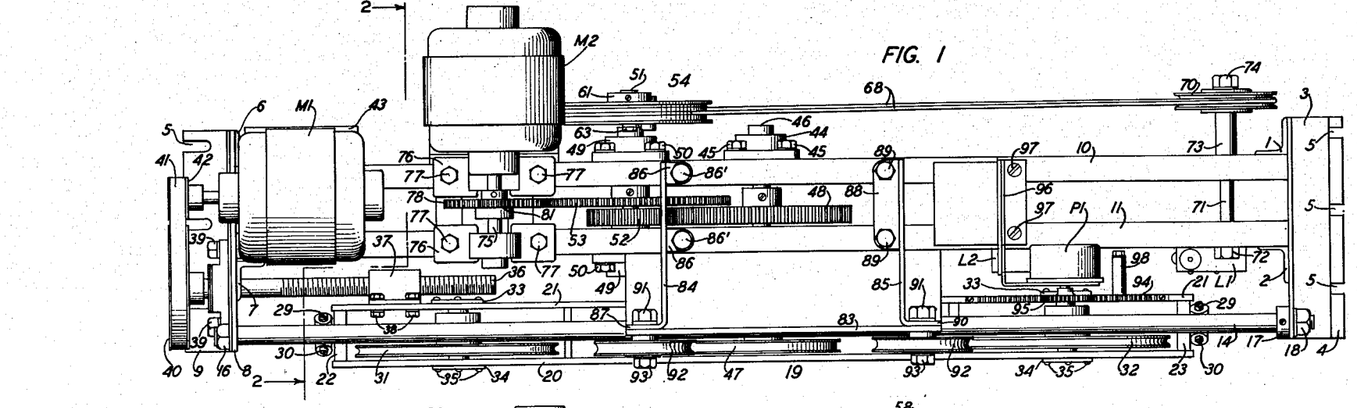
Fig. 1 is a plan view of a loading or trimming mechanism.
Figures 1A, 2:
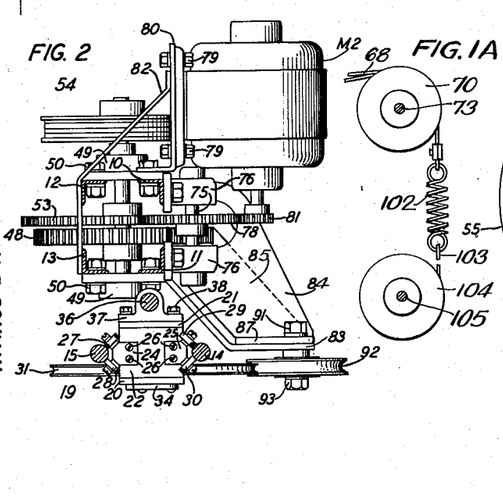
Fig. 1A shows the manner in which the tensioning cable extends to the spring tensioning drum.
Fig. 2 is a cross-sectional view taken along the line 2—2 of Fig. 1.

Positioned between the end members are two parallelly disposed rods 14 and 15, the left ends of the rods being reduced in diameter and extending through holes in the plate 8 and the vertical flange of the angle iron 9, and being secured thereto by the nuts 16. The right ends of the rods have collars 17 secured thereto by set screws which collars abut the outside faces of the vertical flanges of the angle irons 3 and 4 and the ends of the rods beyond the collars are threaded and extend through holes in the angle bars and have nuts 18 threaded thereon by which the ends of the rods are clamped to the angle irons.

Mounted for movement along the rods 14 and 15 is a trimming carriage 19 comprising two side members 20 and 21 joined at their ends by spacers 22 and 23 welded or otherwise secured thereto. Secured to the end spacer 22 by screws 26 are two roller supporting blocks 24 and 25 on one of which are two rotatably disposed rollers 27 and 28 and on the other of which are two rotatably disposed rollers 29 and 30. Four similarly mounted rollers 27 to 30, inclusive, are mounted on the other end spacer 23. As best disclosed in Fig. 2, each pair of rollers 29 and 30 is disposed to engage the under side of the upper rod 14 and each pair of rollers 27 and 28 is disposed to engage the upper side of the lower rod 15 in such a manner that the carriage is supported by the rods but is free to move along such rods.

Positioned between the side members 20 and 21 adjacent the ends thereof are two grooved cable pulleys 31 and 32. Each of these pulleys is secured to a short shaft (not shown) the ends of which are journaled in ball bearing assemblies mounted in holes in the side members 20 and 21. These ball bearing assemblies are retained in position by the plates 33 and 34 secured to the side members by screws 35.

For moving the carriage 19 along the rods 14 and 15 a feed screw 36 is provided which has a threaded engagement with the feed nut 37 secured to the rear face of the side member 21 of the carriage by bolts 38. The feed screw is journaled in a roller bearing assembly (not shown) which is secured to the outer face of the plate 8 of the left end member of the frame by the lag screws 39. Secured to the outer end of the feed screw is a driving pulley 40 grooved to receive the V belt 41 which is driven by the pulley 42 secured to the shaft of a carriage trimming motor M1. The motor M1 is bolted to a mounting plate 43 welded to the upper faces of the frame angle irons 10 and 11.

Journaled in ball bearing assemblies 44 secured to the outer flanges of the frame angle irons 10 and 12, and 11 and 13, by the bolts 45 is a shaft 46. On one end of the shaft 46 a pulley 47 is secured, the pulley being positioned between the side members 20 and 21 of the carriage 19 in alignment with the pulleys 31 and 32 and with the lowermost portion of its grooved surface in horizontal alignment with the lowermost portion of the grooved surfaces of pulleys 31 and 32 as best disclosed in Fig. 6. Also secured to the shaft 46 and positioned between the angle irons 10 to 13, inclusive, of the frame is a spur gear 48.

Also journaled in ball bearing assemblies 49 secured to the outer flanges of the angle irons 10 and 12, and 11 and 13, by the bolts 50 is a shaft 51. Secured to the shaft 51 and positioned between the angle irons of the frame is a pinion gear 52 in mesh with the spur gear 48, and a spur gear 53. Also secured to the rear end of shaft 51 as viewed in Fig. 1 is a loading pulley assembly 54.

Figures 3, 4:
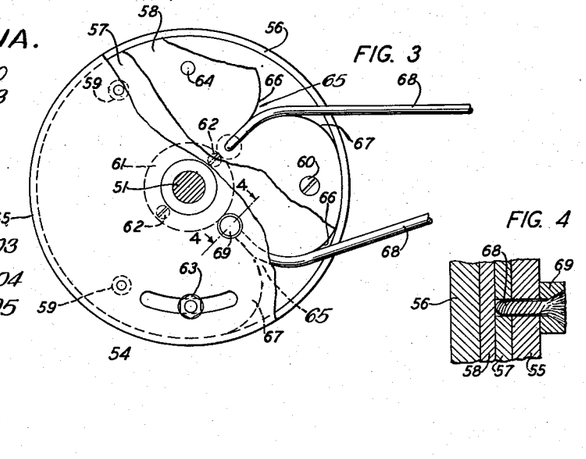
Fig. 3 is a detailed view of the loading pulley with portions broken away to better disclose the manner in which the loading cables are attached to the pulley.
Fig. 4 is a view taken along section lines 4—4 of Fig. 3 showing the manner in which the ends of the loading cables are anchored to the loading pulley.

The pulley assembly 54 as best disclosed in Figs. 3 and 4 comprises two outer flange members 55 and 56 and two inner drum members 57 and 58, the member 57 being secured to the flange member 55 by screws 59 and the member 58 being secured to the member 56 by screws 60. The flange member 56 is secured to the flange of a hub member 61 by screws 62 and the hub 61 is secured to the shaft 51 by a set screw. The flange member 55 and the drum member 57 secured thereto are rotatable on the hub 61 which extends therethrough. The two subassemblies of the pulley 54 are adjustably secured together by two lag screws 63 which extend through arcuate slots in the members 55 and 57 through holes 64 in the drum member 58 and into threaded holes in the flange member 56.

Each of the drum members 57 and 58 is provided with a slot 65 widening out from a point near the hub 61 towards the periphery of the member the walls of the slot being curved as shown at 66 and 67 in Fig. 3. It is to be noted that the slots 65 of the two drum members 57 and 58 are rotationally displaced with respect to each other and that this displacement may be changed by the loosening of the lag screws 63 and by rotating the subassemblies of the pulley 54 with respect to each other for a purpose to be later described.

Extending into each of the slots 65 is a cable 68 the end of which extends through aligned holes drilled through the members of the associated subassembly as shown in Fig. 4 and through a hole in the cable support 69. The hole in the cable support 69 is tapered thereby enabling the ends of the strands of the cable to be spread out and soldered together to thus anchor the end of the cable to the drum member. The two cables 68 pass over a guide pulley 70 and are then clamped together and connected to one end of a tensioning spring such as is disclosed in Fig. 1A and schematically disclosed in Fig. 6. The pulley 70 is journaled upon the end of a stud 71 which extends through holes in the vertical flanges of the upper angle irons 10 and 11 and is clamped to the angle iron 11 by the nut 72. The pulley is positioned on the stud 71 between the spacer 73 and the nut 74 which nut retains the pulley on the stud.

A short shaft 75 is journaled in ball bearing assemblies 76 secured to the upper surfaces of the angle irons 10 and 11 by the bolts 77 and has secured thereto an idler gear 78 which meshes with the spur gear 53. Secured by the bolts 79 to the L-shaped bracket 80 is a motor M2 having a pinion 81 on its rotor shaft in mesh with the idler gear 78. The bracket 80 has its short or vertical arm welded to the vertical flange of the angle iron 10 and is braced by the brace 82, one end of which is welded to the horizontal arm of the bracket and the other end of which is welded to the under side of the horizontal flanges of the angle irons 12 and 13.

Secured to the outer vertical flanges of the angle irons 11 and 13 is an upwardly and outwardly extending bracket 83 which is braced by braces 84 and 85, each brace having a vertically disposed portion having its lower edge contoured to be parallel to the upper surface of the bracket. The brace 84 has two ears 86 inturned from its lower edge and secured to the upper flanges of the angle irons 10 and 11 by bolts 86' and an outturned ear 87 which is welded to the vertically disposed portion of the bracket 83. The brace 85 has an ear 88 inturned from its lower edge and secured to the upper flanges of the angle irons 10 and 11 by bolts 89 and an outturned ear 90 which is welded to the vertically disposed portion of the bracket 83. Secured by nuts 91 to the vertically disposed portion of the bracket 83 near the upper corners thereof are two studs 83 on which are rotatably mounted two guide pulleys 92, the pulleys being retained on the studs by the nuts 93. These pulleys are so positioned as to be in alignment with the pulleys 31, 32 and 47.

Secured to the upper edge of the side member 21 of the trimming carriage 19 is a toothed rack 94 which is in mesh with the pinion 95 mounted on the shaft of the balancing potentiometer P1. The potentiometer P1 is secured to a bracket 96 fastened by screws 97 to the upper flanges of the angle irons 10 and 11. Also secured to the side member 21 of the trimming carriage 19 is a stud 98 which is effective to operate one or the other of the limit switches L1 and L2 in the two extreme positions of movement of the trimming carriage. The limit switches are supported in any suitable manner on the vertical flange of the angle iron 13.

The upper portion of Fig. 6 shows schematically the manner in which the trimming and loading mechanism disclosed in Figs. 1 to 4, inclusive, may be installed in the trainer in connection with the yoke. For this purpose a pulley 100 is shown connected to the shaft on which the yoke or stick 101 is mounted and to which pulley a cable 99 is clamped. The cable then extends over the guide pulleys 92 of the unit, over the pulley 32 of the trimming carriage, around the pulley 47 secured to shaft 46 to which the cable ends are clamped, around the pulley 31 and the other guide pulley 92 back to the pulley 100. With the carriage stationary the rotation of the pulley 100 by the movement of the yoke is transmitted by the cable 99 to the pulley 46 and thus through the shaft 46 and the gears 48 and 52 to the loading pulley 54 and through the gears 53, 78 and 81 to the motor M2. The rotation of the loading pulley 54 in either direction, dependent upon the direction of movement of the yoke, pulls on one of the cables 68, the pull increasing due to the curved surfaces 66 and 67 of the slot 65 in the drum members 57 or 58 to provide an accelerating movement to the cable 68. As the pulley 54 continues to rotate it rotates against the tension of the spring 102 one end of which is secured to the two cables 68 and the other end of which is secured to a cable 103 wound around and secured to the drum 104 mounted on shaft 105.

A movement of the trimming carriage 19 by the trimming motor M1 in the manner previously described is also translated by the cable 99 into a rotation of the pulley 47 and of the pulley 100 connected with the yoke. The rotation of pulley 47 is communicated to the loading pulley 54 to either relieve or increase the pull exerted on such pulley by the spring 102 dependent upon the direction of movement of the trimming carriage.

It will be noted by reference to Figs. 6 and 8 that similar trimming or loading mechanisms are connected by cables to pulleys operable by the rudder pedals 106 and the aileron control wheel 110, respectively, and that the associated tensioning springs 107 and 111 are connected to cables 108 and 112 wound around and secured to the drums 109 and 113 mounted on shaft 105. To simultaneously and similarly apply tension to the springs 102, 107 and 111 the drums 104, 109 and 113 are rotated by the shaft 105, from the shaft 114 through the reduction gears 115. Shaft 114 is operated as will hereinafter be described by the motor M7 of the control circuit of Fig. 7. The three loading or trimming mechanisms disclosed in Figs. 6 to 8 are preferably mounted one above the other in the trainer on a supporting rack and the spring tensioning cables therefrom extend over the guide pulleys 70 and then downwardly to the springs the other ends of which are connected to the cables 103, 108 and 112 which are wound around a single drum on the shaft 105.

For controlling the trimming motor of each of the trimming or loading mechanisms a control circuit is provided, the control circuit for the elevator trimming mechanism being disclosed in full in the upper portion of Fig. 5 and similar control circuits for the rudder trimming and aileron trimming mechanisms being indicated by the boxes 550 and 700 in the lower portion of Fig. 5 and the upper portion of Fig. 7. To enable a clearer understanding of the invention the trimming motor M1, the dynamic brake motor M2, the balancing potentiometer P1 and the rack 94 and pinion 95 for operating it, the limit switches L1 and L2 and the stud 98 for operating such switches appertaining to the elevator trimming mechanism of Fig. 6, have been schematically disclosed in the motor control circuit of Fig. 5 rather than as a part of the actual structure of the trimming mechanism as illustrated in Fig. 1, except that the position of motor M2 is also disclosed in the trimming mechanism of Fig. 6 to illustrate the geared connection of the shaft of this motor with the shaft 46. It is to be understood that similar elements would constitute a portion of the control circuits indicated by the boxes 550 and 700.

Each of the motors M1 and M2 is of the direct current type, the stator winding of each of which is energized by current from the source B1 of direct current. The direction of flow of current through the stator winding of motor M1 may be changed through the operation of reversing relay 522 under the control of anode relay 520 to reverse the direction of rotation of the motor. The rotor of the motor M1 is energized by positive impulses of current supplied thereto from an alternating source AC through the firing of the gas-filled tubes VT4 and VT5. The motor M2 has its rotor short-circuited to enable the motor to function as a dynamic brake.

In addition to the gas-filled tubes VT4 and VT5, a third gas-filled tube VT6 is provided to control the anode relay 520. A dual amplifying tube VT1 and two dual rectifier tubes VT2 and VT3 are also provided. The amplifier tube VT1 serves to receive an input potential, to amplify it in two stages of amplification and to apply the amplified potential through the step-up transformer T1 to the anodes of the rectifier tube VT2. The tube VT2 serves as a full wave rectifier to rectify the input potential applied to its anodes and to apply it as a positive potential to the grids of the gas-filled tubes VT4 and VT5. The output potential from the tube VT1 is also applied through the lower secondary winding of transformer T1 to the control grid of the gas-filled tube VT6.

Filament heating current for all of these tubes is supplied from a source of commercial alternating current supply through the windings of power transformer T2 and direct current for furnishing grid bias to the control grids of tubes VT4, VT5 and VT6 is supplied from the alternating current source through the power transformer T2 and the dual rectifier tube VT3. Anode potential of 60 cycles is supplied to tubes VT4, VT5 and VT6, over the secondary windings of transformer T3, the anode potential supplied to tube VT4 being displaced 180 degrees in phase from the potential supplied to the anode of tube VT5. Tube VT1 is supplied with anode potential from the direct current source B2.

The control or trimming potentiometer P2 is controlled by the elevator trimming wheel 524 located beside the pilot's seat, the brush shaft of such potentiometer being connected by reduction gearing in any suitable manner with the shaft of the trimming wheel. The winding of this potentiometer and the winding of the balancing potentiometer P1 are energized from the divided secondary of the signaling potential supply transformer T4, the potentials supplied to these windings being displaced 180 degrees in phase. The sources of potential applied to the primary windings of transformers T3 and T4 are preferably of different potential but phased the same.

The control circuit for the spring tensioning motor M7 disclosed in the lower portion of Fig. 7 is substantially the same as the control circuit for the trimming mechanisms except that no dynamic brake motor is required and the balancing potentiometer P7 and limit switches are driven by shaft 751 connected by suitable reduction gearing to the rotor shaft of the motor M7. This control circuit is controlled from a control potentiometer P9 driven from the indicated air speed circuit of the trainer as illustrated in part in Fig. 9.

The indicated air speed motor control circuit is of the type fully disclosed in Patent No. 2,428,767, granted October 14, 1947, to W. P. Albert, R. C. Davis, R. H. Gumley and W. H. T. Holden. This circuit is provided with a direct current motor M9 which, through a gear reduction box 900, drives shaft 901 on which are mounted the variable potentiometer P9, the variable autotransformers V1 and V2 and a pair of limit switches L23 and L24.

For controlling the motor M9 whereby it may be driven in either direction of rotation, two incoming signal amplifier tubes VT21 and VT22, two dual rectifier tubes VT23 and VT24 and two gas-filled tubes VT25 and VT26 and three relays 902, 903 and 904 are provided. The tubes VT21 and VT22 are connected in tandem and serve to receive an input signal potential, to amplify it and apply it through the step-up transformer T21 to the anodes of the rectifier tube VT23. The tube VT23 serves as a full wave rectifier to rectify the input potential applied to its anodes and to apply it as positive potential to the grid of gas-filled tube VT25. The output potential from tube VT22 is also applied through the lower secondary winding of transformer T21 to the control grid of the gas-filled tube VT26.

Filament heating current for all these tubes is supplied from a source of commercial alternating current through the windings of power transformer T22 and direct current for furnishing grid bias to the control grids of tubes VT25 and VT26 is supplied from the alternating current source through the power transformer T22 and the dual rectifier tube VT24. Anode potential is applied to tubes VT21 and VT22 from battery B22 and 60-cycle alternating current anode potential is supplied to the anodes of tubes VT25 and VT26 through the halves of the secondary winding of transformer T23, the anode potential supplied to tube VT26 being displaced 180 degrees in phase from the anode potential supplied to tube VT25.

The motor M9 is of the direct current type, its stator winding being supplied with direct current from the source B21, over the contacts of the reversing relay 903 whereby through the operation of the reversing relays 902 and 903 under the control of tube VT26 the direction of rotation of the motor may be reversed. The rotor of motor M9 is energized by positive impulses of current supplied thereto from the upper secondary winding of transformer T23 through the firing of tube VT25.

The apparatus appertaining to the invention having now been described it will first be assumed that the pilot has started the trainer on a simulated flight and that it is being operated at a cruising speed which is indicated to him by the indicated air speed indicator of the trainer which has attained a setting through the operation of the motor M9 of the indicated air speed motor control circuit of Fig. 9.

As the motor M9 rotates the shaft 901 to a position indicative of the cruising speed of the trainer in its simulated flight, the brush of potentiometer P9 is moved to a position in which the control circuit for the spring tensioning motor M7 is no longer balanced. Potential from the 60-cycle alternating current source connected between terminals 753 and 754 of the primary winding of transformer T14 is applied as a potential of phase $\phi 1$ over a circuit from ground through the left portion of the secondary winding of transformer T14, over conductor 755, over the winding of potentiometer P9 to ground and, the potential derived therefrom in accordance with the setting of the brush of potentiometer P9 is applied from such brush over conductor 756 through resistance A11, condenser C11 and rheostat R11 to ground. At the same instant potential of phase $\phi 2$ is applied over a circuit from ground through the right portion of the secondary winding of transformer T14 and through the winding of balancing potentiometer P7 to ground and, the potential derived therefrom in accordance with the position of the brush of potentiometer P7 is applied over a circuit from such brush, through resistance A12 and thence through condenser C11 and rheostat R11 to ground.

It is assumed that potential of phase $\phi 1$ predominates and that therefore a potential of this phase having a value equal to the difference between the control potential of phase $\phi 1$ and the balancing potential of phase $\phi 2$ is applied to rheostat R11 and that a potential derived therefrom is applied over the brush of rheostat R11 and through resistance 757 to the input grid of amplifier tube VT11. Tube VT11 amplifies this potential and impresses it upon the primary winding of input transformer T11. Amplifier T11 over its upper secondary winding steps up this potential and applies it through the full wave rectifier tube VT12 upon the control grids of tubes VT14 and VT15 where it appears as a positive potential of phase $\phi 2$.

Normal negative biasing potential is applied to the grids of tubes VT14 and VT15 from the left secondary winding of power supply transformer T12 and through the right unit of rectifier tube VT13 so that the tubes VT14 and VT15 are critically biased when no signal is being received. The biasing circuit for tube VT14 may be traced from the grid thereof, through resistances 758 and 759 to the slider of rheostat R12, over the anode-cathode path through the right unit of tube VT13, through the left secondary winding of transformer T12, through resistance 760 to the cathode of tube VT14. A similar biasing circuit extends from the grid of tube VT15 through resistances 761 and 759 and thence as traced through resistance 760 to the cathode of tube VT15.

Alternating current potential of 60 cycles applied from a source connected between the terminals 762 and 763 of the primary winding of transformer T13 is impressed upon the secondary winding of such transformer, and such secondary winding having its middle point grounded, potentials 180 degrees apart in phase are derived from the two portions of the secondary winding. Potential of phase $\phi 1$ is applied from the left portion of the secondary winding over the right back contact of relay 754 and through choke coil 755 to the anode of tube VT15 and potential of phase $\phi 2$ is applied from the right portion of the secondary winding over the left back contact of relay 764 and through choke coil 766 to the anode of tube VT14.

Since the tube VT12 serves as a full wave rectifier, at the instant the signaling potential appears as positive potential on the grid of tube VT15 the anode of tube VT15 will also be positive and tube VT15 will therefore fire and apply a positive impulse of current over a circuit from ground through the left portion of the secondary winding of transformer T13, over the right back contact of relay 764, through coil 765, over the anode-cathode path through tube VT15 and through the rotor of motor M7 to ground. During the next half cycle of the signaling potential when it again appears as a positive potential on the grid of tube VT14, the anode of tube VT14 will also be positive and tube VT14 will fire and apply a positive impulse of current to the rotor circuit of motor M7 over a circuit from ground through the right portion of the secondary winding of transformer T13, over the left back contact of relay 764, through coil 766, over the anode-cathode path through tube VT14 and through the rotor of motor M7 to ground. Thus the tubes VT14 and VT15 alternately function on successive half cycles of the signaling potential to transmit impulses of current through the rotor of the motor.

At the instant that the signal potential of phase φ2 is impressed upon the grids of tubes VT14 and VT15, potential of the same phase is impressed upon the grid of tube VT16. This tube is supplied with a normal negative bias from the middle secondary winding of power transformer T12 and through the left unit of rectifier tube VT13 so that tube VT16 is critically biased when no signal is being received. The biasing circuit for tube VT16 may be traced from its grid through resistance 767, through the lower secondary winding of input transformer T11 to the slider of rheostat R13, over the anode-cathode path through the left unit of tube VT13 and thence through the middle secondary winding of transformer T12 to the filament of tube VT16.

At this instant the anode of tube VT16 is supplied with negative anode potential of phase φ1 over a circuit from ground through the left portion of the secondary winding of transformer T13, through lamp resistance 768, thence in parallel through resistance 769 and the winding of anode relay 770 and through choke coil 771 to the anode of tube VT16. With positive potential of phase connected to the grid and negative potential of the other phase connected to the anode of tube VT16 the tube does not fire and relay 770 does not operate and consequently relay 772 is not operated. With relay 772 not operated a circuit is established from ground through the direct current source B11, through the ballast lamp 713, over the inner right back contact of relay 772, through the stator winding of motor M7, over the outer right back contact of relay 772, over the normal contact of limit switch LI2 to ground. With the stator winding thus energized and the rotor winding energized by the alternate firing of tubes VT14 and VT15, the motor M7 is operated in a direction to rotate the brush of potentiometer P7 toward the lower end of its winding.

As the motor M7 speeds up the counterelectromotive force generated thereby increases and during the application of the positive driving impulses to the rotor circuit, impulses of counterelectromotive force appear as positive potentials on the cathodes of tubes VT14 and VT15 in opposition to the incoming signaling potential. When the speed of the motor increases to such an extent that the counterelectromotive force equals the incoming signal potential, the tubes cease firing and the motor coasts until its generated counterelectromotive force falls below the potential of the incoming signal. Then the tubes will again commence firing alternately until the motor again attains a speed commensurate with the potential of the incoming signal.

When the tubes VT14 and VT15 cease firing either momentarily or when the signaling potential becomes reduced to a zero value through the counterbalancing effect of the counterelectromotive force, the motor M7 coasts and an inductive surge potential is generated in the motor opposite in polarity to the impulses which have been driving the motor, which surge potential becomes applied to the cathodes of tubes VT14 and VT15 whereby that one of the tubes whose anode is at the time positive might falsely fire thereby transmitting another or false driving impulse through the rotor circuit of the motor. When this impulse ceases through the extinguishment of the fired tube another inductive surge potential applied from the motor may similarly falsely fire the other tube so that in this manner the motor may continue to operate even though no signaling potential is being received or the signaling potential is entirely balanced by the counterelectromotive force of the motor.

To prevent this false firing of the tubes by such inductive surges from the motor the condenser C12, shunted by resistance 760, and resistance 774 are provided. When the motor is being driven by impulses transmitted through its rotor circuit through the tubes VT14 and VT15, the counterelectromotive force generated by the motor is applied across the terminals of condenser C12 to charge such condenser over a circuit which may be traced from ground through the rotor of the motor, through condenser C12 and resistance 774 to ground. Whenever the motor ceases to receive driving impulses and starts to coast the charge on condenser C12 becomes applied as a positive potential to the cathodes of tubes VT14 and VT15 in opposition to the negative potential applied thereto by the inductive surge from the motor and therefore the cathodes of the tubes cannot become sufficiently negative with respect to the grids to cause the tubes to fire falsely. When the motor ceases to operate the charge on condenser C12 becomes dissipated through resistance 760.

As the brush of potentiometer P7 moves toward its lower winding terminal under the control of motor M7, as just described, potential of phase φ2 applied over the circuit previously traced through rheostat R11 will increase in value until it balances the potential of phase φ1 applied from potentiometer P9 of the indicated airspeed circuit. As the unbalance decreases the potential impressed upon the grids of tubes VT14 and VT15 decreases resulting in a decrease in the speed of motor M7 until it finally stops when the brush of potentiometer P7 reaches a point where the potentials of opposite phase transmitted through the rheostat R11 are in balance and no signal potential is impressed upon the grids of tubes VT14 and VT15. Shaft 114 has thus been rotated in such a direction as, through the reduction gears 115 and shaft 105, to rotate the drums 104, 109 and 113 to place tensions on the springs 102, 107 and 111 commensurate with the airspeed at which the simulated flight is being conducted.

It will now be assumed that from the indication given by the horizon bar of the artificial horizon indicator, the pilot notes that the trainer while being flown in a simulated level straight line flight shows what would in an actual aircraft be a tendency to nose up. Accordingly, the pilot turns the elevator trimming wheel 524 in such a direction as to cause the movement of yoke 101 into the position into which the yoke of an actual aircraft would be moved through the adjustment of the elevator trimming tab to correct a nosing up tendency.

When the pilot turns the elevator trimming wheel 524 of the trainer, the brush of potentiometer P2 is moved thereby in a clockwise direction whereby the control circuit for elevator trimming, disclosed in Fig. 5, becomes unabalanced. Alternating current from the 60-cycle source connected between terminals 503 and 504 of the primary winding of transformer T4 and impressed upon the divided secondary winding of this transformer causes potentials 180 degrees apart in phase, which may be termed phase $\varphi 1$ and phase $\varphi 2$, to be impressed across the terminals of the windings of potentiometers P1 and P2, whereby a potential of phase $\varphi 1$ is derived from the potentiometer P2 and impressed over a circuit extending from ground, over the left portion of the secondary winding of transformer T4, over the left portion of the winding of potentiometer P2 and the brush thereof, through resistance A2, condenser C1 and rheostat R1 to ground. At the same time a potential of phase $\varphi 2$ is derived from the potentiometer P1 and impressed over a circuit extending from ground over the right portion of the secondary winding of transformer T4, over the left portion of the winding of potentiometer P1 and the brush thereof, through resistance A1, condenser C1 and rheostat R1 to ground. Since the brush of potentiometer P2 has been assumed to have been moved by the elevator trimming wheel 524 to a position to reduce the potential of phase $\varphi 1$ and to thereby unbalance the control circuit, potential of phase $\varphi 2$ will predominate in the circuit through rheostat R1 and a potential of this phase will therefore be applied to the input grid of tube VT1, will be amplified by tube VT1 and impressed through the transformer T1 and the rectifier tube VT2 upon the control grids of the gas-filled tubes VT4 and VT5 as a positive signaling potential. At the same time the signaling potential will also be applied over the lower secondary winding of transformer T1 upon the control grid of gas-filled tube VT6.

In the manner previously described in connection with the operation of the control circuit for the spring tensioning motor, the tubes VT4 and VT5 will alternately fire in response to the signaling potential and tube VT6 will also fire since the signaling potential applied to its control grid is in phase with the anode potential applied to its anode over the circuit from ground through the right portion of the secondary winding of transformer T3, through the winding of anode relay 520 and resistance 519 in parallel, through the choke coil 521 to the anode of tube VT6. Consequently, anode relay 520 and reversing relay 522 are operated and the stator circuit of motor M1 is established from ground through the source of direct current B1, through ballast resistance lamp 523, over the outer right front contact of relay 522, through the stator winding of motor M1, over the inner right front contact of relay 522, over the normal contact of limit switch L1 to ground. With the rotor circuit of motor M1 energized by impulses of positive current transmitted alternately therethrough over the cathode-anode paths through tubes VT4 and VT5, the motor is now driven in such a direction of rotation as to rotate the feed screw 36 in a clockwise direction to thereby move the trimming carriage 19 towards the left as viewed in Fig. 6.

As the carriage moves toward the left, the rack 94 rotates the gear 95 and thereby rotates the brush of the balancing potentiometer P1 in a clockwise direction. As the brush of potentiometer P1 thus moves, the potential of phase $\varphi 2$ transmitted thereover through the rheostat R1 is decreased, thereby reducing the unbalance of the control circuit and the value of the signaling potential applied to the grids of tubes VT4 and VT5. The motor M1 thereupon slows down and when the brush of potentiometer P1 is so positioned that the potential of phase $\varphi 2$ applied thereover equals the potential of phase $\varphi 1$ applied over the brush of potentiometer P2, no signaling potential will appear on the grids of tubes VT4 and VT5 and the motor M1 will thereupon come to rest.

The movement of the trimming carriage 19 toward the left, tends to rotate the pulley 47 and the pulley 100 through the pull exerted by the cable 99, but the pulley 47 is restrained from turning freely by the opposing force exerted through the gear train including the gears 48, 52, 53, 78 and 81 connecting the shaft 46 on which pulley 47 is mounted and the rotor shaft of the dynamic brake motor M2. Consequently pulley 100 rotates in a counter-clockwise direction and moves the yoke 101 to the left or in the direction in which a pilot would move the yoke of an actual aircraft to correct a tendency of such aircraft to nose up. The horizon bar of the trainer should now indicate a simulated level flight. The yoke will now remain in its adjusted position without the application of any holding force thereto by the pilot.

The pilot could of course accomplish the trimming of the elevator by first moving the yoke until the horizon bar indicates level flight and then operate the elevator trimming wheel until the yoke maintains its adjusted position without any effort on the part of the pilot.

In a similar manner the pilot may correct any tendency of the trainer to simulate the yawing or rotation of an aircraft about its vertical axis, by the operation of the rudder trimming wheel until the rate of turn indicator indicates a straight line flight. To simulate the trimming of the rudder so that the pilot need not operate and hold the rudder pedals in the required position to maintain the straight line flight, the pilot operates the rudder trimming wheel whereupon the control circuit for rudder trimming indicated by the box 550 of Fig. 5 functions to move the trimming carriage of the rudder loading or trimming mechanism from Fig. 6 until the pedals will attain their required positions without any pressure on them by the pilot.

Also in a similar manner, the pilot may correct any tendency of the trainer to simulate the roll or rotation of an aircraft about its longitudinal axis, by the operation of the aileron trimming wheel until the bank indicator or ball indicator indicates that the flight is no longer banked. To simulate the trimming of the ailerons so that the pilot need not operate and hold the aileron wheel in the required position to correct this condition of unbalance, the pilot operates the aileron trimming wheel whereupon the control circuit for aileron trimming, indicated by the box 700 of Fig. 7 operates to move the trimming carriage of the aileron loading or trimming mechanism of Fig. 8 until the aileron wheel will retain the required position without any operation of it by the pilot.

Having completed the trimming of the trainer, it will now be assumed that the pilot desires to start a long steady climb to a high altitude. To accomplish this the pilot increases the air speed whereupon the indicated air speed motor control circuit of Fig. 9 is controlled in accordance therewith and through the new setting of the potentiometer P9 associated therewith causes the control circuit for spring tensioning, disclosed in Fig. 7, to function in the manner previously described to increase the tension of springs 102, 107 and 111, commensurate with the increased air speed. The pilot now pulls back on the yoke 101 until a desired rate of climb is attained.

When the pilot pulls back on the yoke 101 or toward the right as viewed in Fig. 6 the movement of the yoke is transmitted through the cable 99 to the pulley 47 and thus to the shaft 46 whereby through the gears 48 and 52 the loading pulley 54 is rotated in a counterclockwise direction and whereby through the gears 53, 78 and 81 the rotor of motor M2 is rotated. As the pulley 54 rotates it exerts a pull on the upper cable 68 against the tension of spring 102 whereby a resistance to the turning of pulley 54 is communicated by the cable 99 to the pulley 100 and appears on the yoke 101 as a load which the pilot must overcome to move the yoke. At the same time due to the step up ratio of the gear train including gears 48, 52, 53, 78 and 81 the rotor of motor M2 is rotated in the field of such motor and since the rotor circuit of such motor is short-circuited the motor serves as a dynamic brake to exert a drag which is communicated back through the gearing, pulleys and cable 99 to the yoke to give the pilot the usual feel of the yoke. This drag is, as before described, augmented by the resistance due to the tensioning of spring 102.

At the increased air speed considerable effort may be required to pull the yoke back and the pilot may reduce this effort by operating the elevator trimming wheel 524. As previously stated, in an actual aircraft if the pilot desires to lessen the effort required to move the elevator for executing a climbing maneuver, he would turn the elevator trimming wheel in such a direction that the trimming tab on the elevator would be moved down to cause the elevator surface to move up and thereby force the nose of the aircraft to rise. In the trainer this operation is simulated by the rotation of the trimming wheel 524 in such a direction that the brush of the trimming potentiometer P2 is moved counter-clockwise to thereby increase the phase $\phi 1$ potential applied over the circuit through rheostat R1, whereby this potential overbalances the potential of phase $\phi 2$ applied over the brush of balancing potentiometer P1 over the circuit through rheostat R1. Consequently a potential of phase $\phi 1$ derived from the rheostat R1, is applied to the input grid of tube VT1, is amplified by such tube and in the manner previously described is applied as a potential of phase $\phi 1$ upon the control grids of tubes VT4, VT5 and VT6.

Since the potential applied to the grid of tube VT6 is out of phase with the potential applied to the anode of this tube, tube VT6 does not become conducting and therefore relays 520 and 522 are not operated. Tubes VT4 and VT5 will, however, alternately fire to transmit positive impulses of current through the rotor circuit of motor M1 and, with the stator circuit of the motor completed from ground through the source of direct current B1, through lamp resistance 523, over the innere right back contact of relay 522, through the rotor circuit, over the outer right back contact of relay 522 and over the normal contacts of limit smitch L2 to ground, the motor M1 rotates in such a direction as to rotate the lead screw 36 in a counter-clockwise direction to thereby move the trimming carriage 19 of the elevator loading and trimming mechanism toward the right as viewed in Fig. 6.

As the carriage moves toward the right, the rack 94 rotates the gear 95 and thereby rotates the brush of the balancing potentiometer P1 in counter-clockwise direction. As the brush of potentiometer P1 thus moves, the potential of phase $\phi 2$ is increased, thereby reducing the unbalance of the control circuit and the value of the signaling potential which is applied to the grids of tubes VT4 and VT5. The motor M1 thereupon slows down and when the brush of potentiometer P1 is so positioned that the potential of phase $\phi 2$ applied thereover, equals the potential of phase $\phi 1$ applied over the brush of potentiometer P2, no signaling potential will appear on the grids of tubes VT4 and VT5 and the motor M1 will thereupon come to rest.

The movement of the yoke 101 toward the right, through the cable 99 causes the clockwise rotation of pulley 47 and consequently a counter-clockwise rotation of the loading pulley 54 which is restrained in its rotation through the heavy pull exerted by the upper cable 68 due to the increased tension placed on spring 102 in response to the increase of the air speed of the simulated flight. However, the movement of the trimming carriage 19 toward the right by the operation of motor M1, tens through the cable 99, to cause the pulley 47 to rotate in a counter-clockwise direction, and consequently to cause the loading pulley 54 to rotate in a clockwise direction. Thus two opposite rotational forces are applied to the loading pulley 54, one by the movement of the yoke and the other by the movement of the trimming carriage in response to the operation of the elevator trimming wheel 524. Thus if the trimming wheel is rotated sufficiently, the effort required to move the yoke to the position required to execute the climbing maneuver may be materially reduced or indeed the entire effort required to move the yoke may be supplied through the trimming carriage in response to the operation of the trimming wheel. Once the yoke has been moved to such a position that a climb at the desired rate is being simulated, the yoke may be retained in such position under the control of the trimming mechanism with little or no effort on the part of the pilot.

Similar assistance for moving the elevator in the opposite direction may be attained by the rotation of the elevator trimming wheel 524 in the opposite direction, and assistance for moving the rudder or ailerons in either direction of their movement may be had through the operation of the rudder and aileron trimming wheels associated with the rudder trimming control circuit 550 and the aileron trimming control circuit 700 and the operation of the rudder loading or trimming and the aileron loading or trimming mechanisms associated therewith.

When desired, an instructor may cause the trainer to simulate a flight during which rough air conditions are encountered. Under such circumstances the rough air circuit indicated by the box 950 of Fig. 9 is caused to operate, whereupon the control circuits for elevator trimming, rudder trimming and aileron trimming are unbalanced by potentials applied in a promiscuous manner from the rough air circuit over conductors 951, 952 and 953 and through the resistances A3, A6 and A9 serially connected therein, to the inputs of such control circuits. The rough air circuit and the manner in which it functions are fully disclosed in Patent No. 2,460,743, granted February 1, 1949, to C. E. Germanton. Through the unbalancing of the trimming control circuits, the loadings applied to the yoke, to the rudder pedals and to the aileron wheel may be increased or decreased through the operation of the trimming carriages in the manner hereinbefore described, whereby the pilot is enabled to sense the effects which rough air would have on an actual aircraft and to operate the controls to counteract such effects.

Since in the operation of an actual aircraft the controls would be affected by the slip stream from the propellers as soon as the engines are started, even through the aircraft does not move and no air speed is developed, provision is also made for applying a fixed potential to the input of the control circuit for the spring tensioning motor to unbalance such circuit and to thereby tension the springs 102, 107 and 111 associated with the yoke, rudder and aileron loading mechanisms. For this purpose, and assuming that the trainer is equipped to simulate the operations of a two-engined aircraft, potential is applied from the brake horse-power motor control circuit 780, through resistance A13, to the input circuit of tube VT11 when the right engine is started and potential is applied from the brake horse-power motor control circuit 790, through resistance A14, to the input circuit of tube VT11 when the left engine is started. Other reactions such as the stalling or the attitude of an aircraft may be simulated in the trainer by the application of potentials responsive to such effects through input resistances such as A11 to the input circuit of tube VT11 of the control circuit for the spring tensioning motor.

Since the failure of either engine of an actual aircraft reacts upon the rudder to cause the aircraft to yaw, provision is made for applying potentials from the brake horse-power motor control circuits 780 and 790 through resistances A7 and A8 to the control circuit for rudder loading or trimming 550.

The position of the wing flaps of an aircraft and the thrust horse-power developed by the aircraft engines also have reactions on the elevator and therefore on the yoke and these reactions are simulated in the trainer through the application of potential applied from the flap motor control circuit 580 through resistance A4 to the input circuit of tube VT1 of the control circuit for elevator trimming and from the thrust horse-power motor control circuit 590 through resistance A5 to the input circuit of tube VT1.

What is claimed is:

1. In an aircraft trainer, control means corresponding to the control means of an aircraft for moving the steering surfaces thereof, means for applying a steady force opposing the operation of each of said control means in simulation of the forces required to move the steering surfaces when the aircraft is in straight and level flight, an electrical circuit including means for representing air speed, and means controlled by said latter means for applying additional variable forces opposing the movement of said control means simulating the forces required to move the steering surfaces under varying air speed conditions.

2. In an aircraft trainer, a yoke corresponding to the elevator control yoke of an actual aircraft, a dynamic brake connected with said yoke for applying a steady force opposing the movement of said yoke in simulation of the force required to move the elevator when the aircraft is in straight and level flight, an electrical circuit including means for representing air speed, and means controlled by said latter means for applying an additional variable force opposing the movement of said yoke simulating the force required to move the elevator under varying air speed conditions.

3. In an aircraft trainer, rudder pedals corresponding to the rudder pedals of an actual aircraft, a dynamic brake connected with said pedals for applying a steady force opposing the movement of said pedals in simulation of the force required to move the rudder when the aircraft is in straight and level flight, an electrical circuit including means for representing air speed, and means controlled by said latter means for applying an additional variable force opposing the movement of said pedals simulating the force required to move the rudder under varying air speed conditions 4. In an aircraft trainer, an aileron control means corresponding to the aileron control means of an actual aircraft, a dynamic brake connected with said control means for applying a steady force opposing the movement of said control means in simulation of the force required to move the ailerons when the aircraft is in straight and level flight, an electrical circuit including means for representing air speed, and means controlled by said latter means for applying an additional variable force opposing the movement of said control means simulating the force required to move the ailerons under varying air speed conditions.

5. In an aircraft trainer, a control means corresponding to a steering surface control means of an actual aircraft, a loading pulley, means for communicating the movement of said control means into a rotation of said pulley, a loading spring, a spring tensioning drum, cables connecting the ends of said spring with said pulley and with said drum, and means controlled in accordance with the air speed of the simulated flight being flown by the trainer for rotating said drum to change the tension of said spring whereby a resistance to the rotation of said loading pulley and the movement of said control means is provided which varies with the air speed of the simulated flight.

6. In an aircraft trainer, a control means corresponding to a steering surface control means of an actual aircraft, a loading pulley, means for communicating the movement of said control means into a rotation of said pulley, a loading spring, a spring tensioning drum, two cables having one end of each anchored at different points on said pulley and their other ends secured to one end of said spring, a third cable having one end secured to the other end of said spring and its other end attached to and wound on said drum, and means controlled in accordance with the air speed of the simulated flight being flown by the trainer for rotating said drum to change the tension on said spring whereby a resistance to the rotation of said loading pulley in either direction and to the movement of said control means is provided which varies with the air speed of a simulated flight.

7. In an aircraft trainer, a control means corresponding to a steering surface control means of an actual aircraft, a loading pulley, a driving pulley, speed amplifying gearing interposed between the shafts of said pulleys, a driving cable connecting said control means with said driving pulley, a loading spring, a spring tensioning drum, cables connecting the ends of said spring with said loading pulley and with said drum, and means controlled in accordance with the air speed of the simulated flight being flown by the trainer for rotating said drum to change the tension of said spring whereby a resistance to the rotation of said loading pulley is provided and communicated from said loading pulley through said gearing, driving pulley and driving cable to said control means, which resistance varies with the air speed of the simulated flight.

8. In an aircraft trainer, a control means corresponding to a steering surface control means of an actual aircraft, a loading pulley, means for communicating the movement of said control means into a rotation of said pulley, a loading spring, a spring tensioning drum, cables connecting the ends of said spring with said pulley and with said drum, a control circuit operable in accordance with the indicated air speed of the simulated flight being flown by said trainer, a reversible motor for driving said drum, and a control circuit for said motor operable from said indicated air speed control circuit whereby said drum is rotated in one or the other direction to change the tension of said spring and whereby a resistance to the rotation of said loading pulley and to the movement of said control means is provided which varies with the indicated air speed of the simulated flight.

9. In an aircraft trainer, a control means corresponding to a steering surface control means of an actual aircraft, a loading pulley, a driving pulley, speed amplifying gearing interposed between the shafts of said pulleys, a driving cable connecting said control means with said driving pulley, a direct current motor having a direct current energizer stator and having a short-circuited rotor, speed amplifying gearing interposed between the shafts of said loading pulley and of said motor, said motor when operated from said control means through said driving cable, driving pulley and gearing serving as a dynamic brake to retard the movement of said control means, a loading spring, a spring tensioning drum, cables connecting the ends of said spring with said loading pulley and with said drum, and means controlled in accordance with the air speed of the simulated flight being flown by the trainer for rotating said drum to change the tension of said spring whereby a resistance to the rotation of said loading pulley is provided and communicated from said loading pulley through said first gearing, driving pulley and driving cable to said control means which resistance varies with the air speed of the simulated flight.

10. In an aircraft trainer, a control means corresponding to a steering surface control means of an actual aircraft, a frame, a driving pulley having a shaft journaled in said frame, a trimming carriage movable with respect to said frame and having two pulleys journaled thereon, a driving cable connected to said control means and to said driving pulley and extending over said carriage pulleys, a reversible motor for moving said carriage in either of its directions of movement, a trimming wheel operable to simulate the operation of a trimming tab of the steering surface of an actual aircraft, and a control circuit for said motor responsive to the operation of said trimming wheel whereby said trimming carriage is moved to operate said driving cable and thereby to move said control means to simulate the response of the control means of an actual aircraft to the trimming of a steering surface.

11. In an aircraft trainer, a control means corresponding to a steering surface control means of an actual aircraft, a frame, a driving pulley having a shaft journaled in said frame, a trimming carriage movable with respect to said frame and having two pulleys journaled thereon, a driving cable connected to said control means and to said driving pulley and extending over said carriage pulleys, a reversible motor for moving said carriage in either of its directions of movement, a trimming wheel operable to simulate the operation of a trimming tab of the steering surface of an actual aircraft, a control circuit for said motor unbalanced by the operation of said trimming wheel whereby said trimming carriage is moved to operate said driving cable and thereby to move said control means to simulate the response of the control means of an actual aircraft to the trimming of a steering surface, and means controlled by the movement of said carriage for balancing said control circuit to stop said motor when said carriage has been moved an amount commensurate with the movement of said trimming wheel.

12. In an aircraft trainer, a control means corresponding to a steering surface control means of an actual aircraft, a frame, a driving pulley having a shaft journaled in said frame, a trimming carriage movable with respect to said frame and having two pulleys journaled thereon, a driving cable connected to said control means and to said driving pulleys and extending over said carriage pulleys, a reversible motor for moving said carriage in either of its directions of movement, a trimming wheel operable to simulate the operation of a trimming tab of the steering surface of an actual aircraft, a control circuit for said motor responsive to the operation of said trimming wheel whereby said trimming carriage is moved to operate said driving cable and thereby to move said control means to simulate the response of the control means of an actual aircraft to the trimming of a steering surface, a rough air circuit, and means controlled thereby for operating said control circuit whereby said trimming carriage is moved to thereby move said control means to simulate the effect of rough air on the control means of an actual aircraft.

13. In an aircraft trainer, a control means corresponding to a steering surface control means of an actual aircraft, an electrical circuit including means for representing air speed, means controlled by said latter means for applying a variable force opposing the movement of said control means simulating the force required to move the steering surface under varying air speed conditions, means for simulating the trimming of the steering surface and means controlled by said trimming means to reduce said applied force and to thereby enable said control means to be easily operated.

14. In an aircraft trainer, a control means corresponding to a steering surface control means of an actual aircraft, an electrical circuit including means for representing air speed, means controlled by said latter means for applying a variable force opposing the movement of said control means simulating the force required to move the steering surface under varying air speed conditions, means for simulating the trimming of the steering surface and means controlled by said trimming means to overpower said applied force whereby said control means is operated under the control of said trimming means.

15. In an aircraft trainer, a control means corresponding to a steering surface control means of an actual aircraft, a frame, a loading pulley, a driving pulley, gearing interposed between the shafts of said pulleys, a loading spring, a spring tensioning drum, cables connecting the ends of said spring with said loading pulley and with said drum, means operable in accordance with the indicated air speed of the flight being flown by said trainer for rotating said drum to tension said spring, a trimming carriage movable with respect to said frame and having pulleys journaled thereon, a driving cable connected to said control means and to said driving pulley and extending over said carriage pulleys whereby said tensioned spring imparts a resistance to the movement of said control means, a reversible motor for moving said trimming carriage in either of its directions of movement, a trimming wheel operable to simulate the operation of a trimming tab of the steering surface of an actual aircraft, and a control circuit for said motor responsive to the operation of said trimming wheel whereby said trimming carriage is moved and through said driving cable to rotate said loading pulley in a direction to reduce the resistance to the movement of said control means imposed by said spring.

16. Aircraft training apparatus comprising a manually actuated control member, means for yieldingly resisting manual movement of said member, an electrical circuit including means for representing air speed, and means operated by a potential derived from said air speed circuit for varying a resistance to movement of said control member.

17. Aircraft training apparatus comprising means forming a motor circuit including an air speed motor, a simulated aircraft control member, an electromechanical device disposed to resist the movement of said control, and means responsive to a potential derived from the motor circuit for varying the functional effectiveness of said electromechanical device.

18. Aircraft training apparatus comprising simulated flight controls for practicing maneuvers, means for simulating air speed including an electrical circuit energized in accordance with conjoint operation of said controls, means for deriving a voltage from said circuit varying with the simulated air speed, and control-loading mechanism responsive to said voltage for varying the resistance to movement of certain of said controls from neutral in accordance with change in said simulated air speed.

RICHARD C. DAVIS.
VINCENT F. BOHMAN.
CHARLES E. GERMANTON.

REFERENCES CITED

The following references are of record in the file of this patent:

UNITED STATES PATENTS

| Number | Name | Date |
|---|---|---|
| 1,865,828 | Buckley | July 5, 1932 |
| 2,099,857 | Link | Nov. 23, 1937 |
| 2,124,684 | Behr | July 26, 1938 |
| 2,153,986 | MacLaren | Apr. 11, 1939 |
| 2,336,711 | Barber | Dec. 14, 1943 |
| 2,341,253 | West | Feb. 8, 1944 |
| 2,366,603 | Dehmel | Jan. 2, 1945 |
| 2,385,095 | McCarthy | Sept. 18, 1945 |

FOREIGN PATENTS

| Number | Country | Date |
|---|---|---|
| 396,540 | Great Britain | 1933 |
| 548,093 | Great Britain | 1942 |